Sept. 12, 1967  P. A. G. LEPELLETIER  3,340,968
AUTOMOTIVE VEHICLE BRAKE SYSTEM
Filed Jan. 25, 1965  5 Sheets-Sheet 2
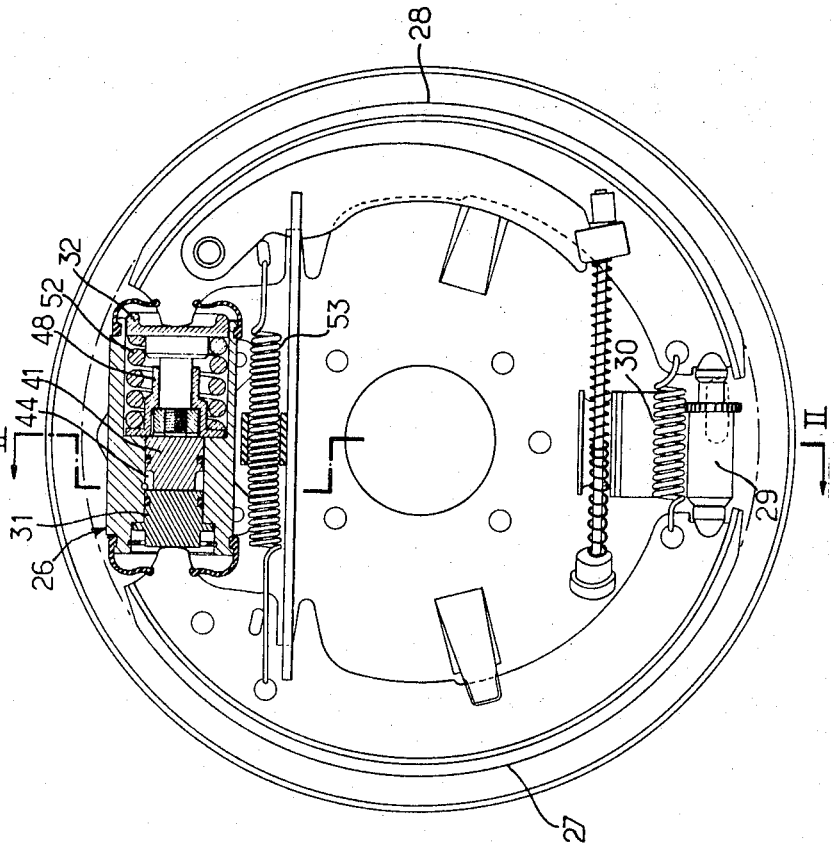
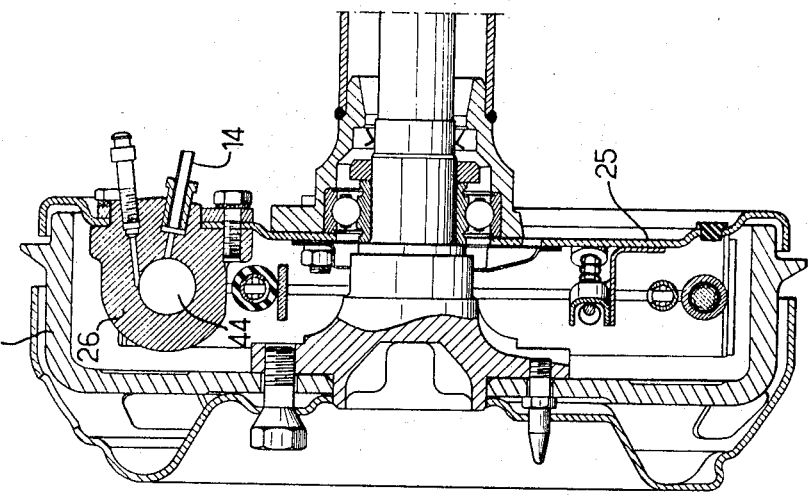
INVENTOR
PIERRE A. G. LEPELLETIER
BY Irvin A. Thompson
ATTY.

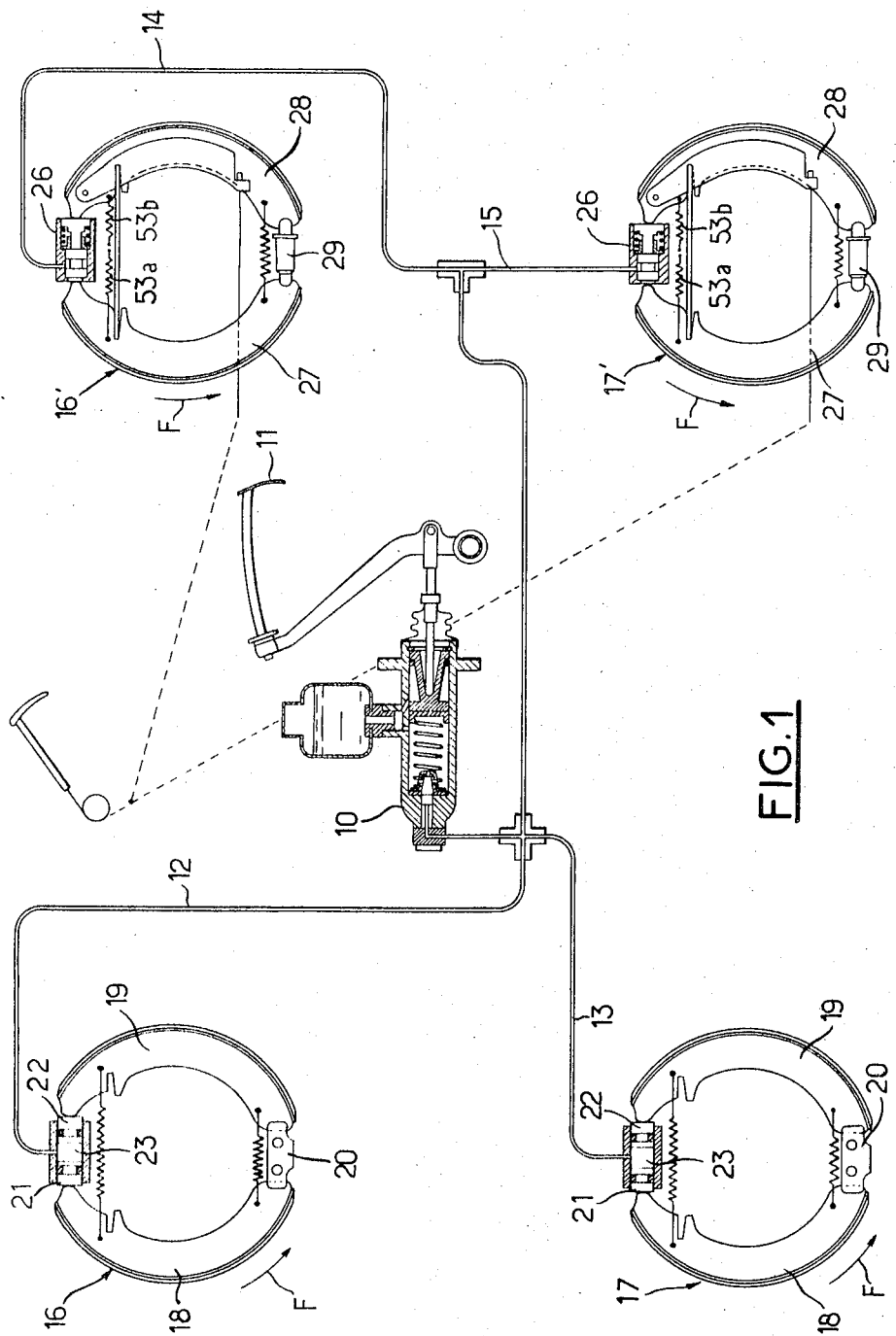

Sept. 12, 1967   P. A. G. LEPELLETIER   3,340,968
AUTOMOTIVE VEHICLE BRAKE SYSTEM
Filed Jan. 25, 1965   5 Sheets-Sheet 4

INVENTOR
PIERRE A.G. LEPELLETIER
By Irwin S. Thompson
ATTY.

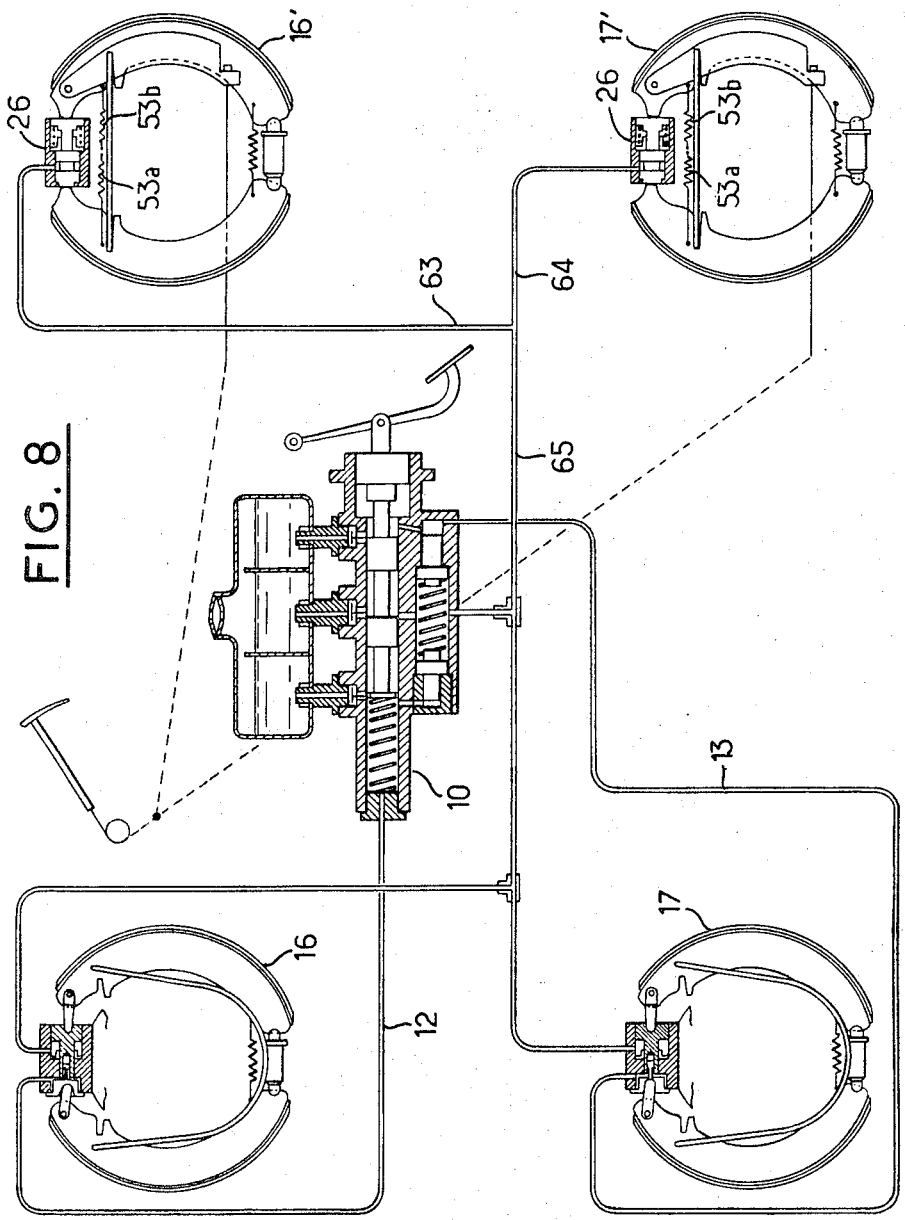

3,340,968
AUTOMOTIVE VEHICLE BRAKE SYSTEM
Pierre André Georges Lepelletier, Chatou, France, assignor to Societe Anonyme Francaise du Ferodo, a corporation of France
Filed Jan. 25, 1965, Ser. No. 427,673
Claims priority, application France, Feb. 10, 1964, 963,165
1 Claim. (Cl. 188—152)

The present invention relates to drum blades, in particular to the rear brakes of a hydraulic braking system of an automotive vehicle, and more especially to such brakes which comprise two jaws intended to be forced against the drum, at least one cylinder having pistons respectively applied to the extremities of the jaws, and elastic restoring means tending to bring the extremities of the jaws closer to each other.

During braking, the weight of the vehicle is transferred towards the front, which makes it necessary to provide a less effective braking at the rear than at the front, in order to prevent the rear wheels from being locked, which is liable to cause a bad skid.

In the usual constructions of rear brakes, this reduced effectiveness imposed by conditions of stability during hard braking is maintained irrespective of the degree of braking. During normal braking, this results in a reduced total braking capacity, and in addition, in more severe working conditions of the front brakes, which may be subjected to considerable heating, especially when driving in towns where very numerous braking actions are necessary. For this reason, the front brakes are less capable of giving a more intense braking effect if this is needed.

The present invention has for its object a method of application of a drum brake, especially a rear brake of an automotive vehicle, in which hydraulic cylinder means are provided to apply jaws against the drum, this method enabling the above-mentioned drawbacks to be eliminated.

The method according to the invention consists, during the course of the rising pressure, in the hydraulic cylinder means, in arranging at least two phases of braking different from each other, a phase of great effectiveness coming first into action, in which the hydraulic cylinder means tend to cause the jaws to rotate in the same direction as the drum, that is to say with a self-locking action, and a phase of moderate effectiveness following subsequently, in which the hydraulic cylinder means tend to cause the jaw to rotate in the opposite direction to the drum, that is to say with a self-releasing action. By virtue of this arrangement, the rear brakes are made very effective during easy braking or at the beginning of hard braking, that is to say when there is no danger of locking the rear wheels, and have a moderate effectiveness when the braking is accentuated, so as to prevent locking. Thus, the total braking capacity is increased, and during driving in towns, when repeated slight braking actions are taken, the rear brakes relieve the work of the front brakes, which remain cold and are thus particularly able to provide a very hard braking, should the need arise.

The present invention has also for its object a drum brake, especially a rear brake of an automotive vehicle, comprising two jaws intended to be pressed against the drum, at least one cylinder having pistons respectively applied, directly or indirectly, against the extremities of the jaws, and elastic restoring means tending to bring the extremities of the jaws closer together, this brake being particularly characterized in that a first piston, the action of which is directed in the direction of movement of the drum, acts directly on a first of the jaws and has its travel limited by two abutments, and in that a second piston having its action orientated in the direction opposite to the movement of the drum, acts on the second jaw through the intermediary of and in co-operation with an intercalated elastic device which is highly pre-stressed, a hydraulic actuating chamber being formed between the two pistons.

The first phase of effective braking, with a self-applying action, is developed when the first piston moves from one abutment to the other, while the second phase of moderate braking, with a self-releasing action, is developed when the first piston has come into abutment, while the braking pressure is continued by the second piston and in co-operation with the intercalated elastic device.

In accordance with a further characteristic feature, the elastic restoring means comprise two springs of different strengths, the weaker being coupled to the first jaw while the stronger is coupled to the second jaw. An arrangement of this kind conveniently enables the pressure to be applied by the first piston during the first phase, and by the second piston and the intercalated elastic device in the second phase.

In one form of construction, a single cylinder is provided in the drum, and the two jaws are connected together, opposite this cylinder, by a coupling strap, while in an alternative form, two opposite cylinders are provided in the drum, each jaw extending between the first piston of one cylinder and the intercalated elastic device of the other cylinder.

The present invention is applicable to braking installations of all kinds. It has an additional advantage when the installation is of the type in which the rear brakes are actuated with delay with respect to the front brakes, for example in an installation having two disc brakes at the front and two drum brakes at the rear. In this case, the arrangement according to the invention enables such a delay to be caught-up very rapidly and makes it possible to take advantage of the full effectiveness of braking, practically from the start of the braking action.

The objects, characteristic features and advantages of the invention will further be brought out in the description which follows below of forms of construction selected by way of example, reference being made to the accompanying drawings, in which:

FIG. 1 is a diagram of a braking system for an automotive vehicle in accordance with the invention;

FIG. 2 is a view of a rear brake of this system, in transverse section taken along the line II—II of FIG. 3;

FIG. 3 is a corresponding view in longitudinal section of the same rear brake;

FIG. 8 shows an alternative form of the braking installation diagram shown in FIG. 1.

Figure 4:
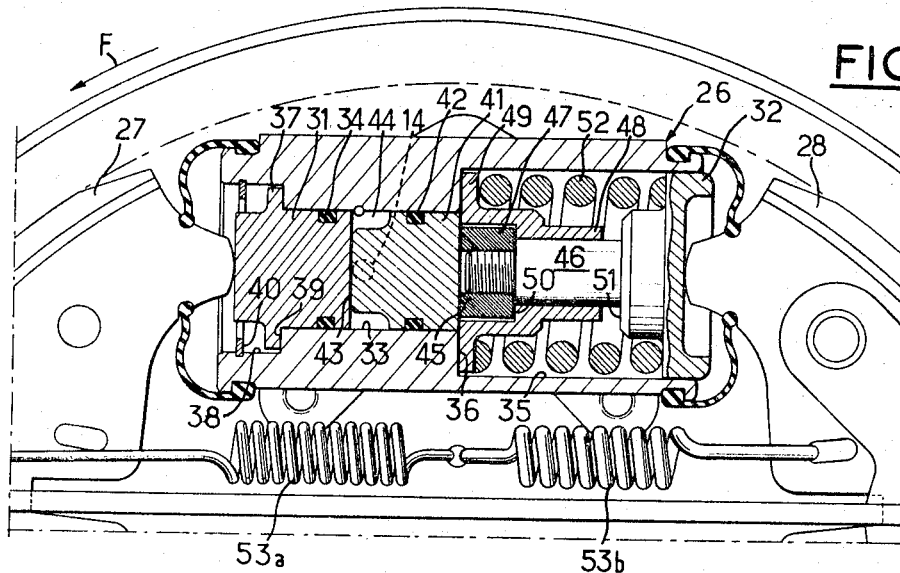
FIG. 4 is a view in cross-section, to a larger scale, of a cylinder of this rear brake.

Reference will first be made to FIGS. 1 to 4. FIG. 1 shows diagrammatically a braking installation of the usual type for an automotive vehicle. A master-cylinder 10, actuated by a brake pedal 11, drives oil at the same pressure into four conduits 12, 13, 14, 15, respectively supplying the right-hand front brake 16, the left-hand brake 17, the right-hand rear brake 16′, and the left-hand rear brake 17′.

In the example shown in FIG. 1, the front brakes 16 and 17 are of the usual drum type with two jaws 18 and 19 applied at one extremity against a fixed support 20 and at the other extremity against the pistons 21 and 22 of the wheel-cylinder 23, supplied by the conduit 12 or 13.

According to the invention, each rear brake 16′ or 17′, shown in more detail in FIGS. 2 and 3, comprises a drum 24 fast for rotation with the wheel, a fixed plate 25 receiving the cylinder 26 supplied by the conduit 14 or 15, and two jaws 27 and 28. The latter are applied at one extremity against a coupling strap 29 which is not fixed but is free to carry out a circumferential movement as a unit with the jaws 27 and 28, the application of the jaws 27 and 28 against the strap 29 being maintained by a spring 30.

At their other extremities, the jaws 27 and 28 are respectively applied against a piston 31 and a part 32 of the cylinder 26. The construction of this cylinder 26 is shown in more detail in FIG. 4, to which reference will now be made.

This cylinder 26 comprises a bore 33 of small diameter, in which the piston 31 provided with a packing joint 34 is slidably mounted, and a bore 35 of large diameter, in which the part 32 can move axially. The bores 33 and 35 are separated by a shoulder 36.

The small piston 31 is provided with a collar 37 which extends into a widened portion 38 which is an extension of the bore 33. The collar 37 can move between two abutments formed respectively on the one hand by the shoulder 39 separating the bores 33 and 38, and on the other hand by a ring 40 fixed in the bore 38, which defines precisely the travel of the piston 31.

In the bore 33 is also engaged a second piston 41 provided with a packing joint 42. The extremity 43 of the piston 41 is intended to come into abutment against the piston 31, and is machined at the periphery so as to form a chamber 44 in the bore 33. This chamber is defined between the two joints 34 and 42 and is coupled to the conduit 14 or 15.

When the collar 37 is in abutment against the shoulder 39 and the pistons 31 and 41 are in abutment with each other, the extremity 45 of the piston 41 which is opposite the extremity 43, is arranged in the same plane as the shoulder 36.

The part 32 forms a portion of an intercalated elastic device placed between the second piston 41 and the jaw 28.

In accordance with this device, the part 32 is provided with a tail 46, on the extremity of which is screwed a nut 47. This latter is intended to come into abutment against the extremity 45 of the piston 41. Around the tail 46 is engaged a ring 48 having a collar 49 intended to come into abutment against the extremity 45 of the piston 41, and against the shoulder 36. The ring 48 is slidably engaged along the tail 46 between two abutments 50 and 51, formed respectively by the nut 47 and by a boss on the part 32. A strong spring 52 supported against the part 32 and against the collar 49 of the ring 48 tends to hold the ring 48 in abutment at 50 against the nut 47, while at the same time it has a high pre-stressing load.

Elastic restoring means tend to bring the extremities of the jaws 27 and 28 adjacent the cylinder 26 as close together as possible, and thus to maintain these extremities strongly applied against the parts 31 and 32. These elastic means may comprise a spring 53 coupled between the jaws, as shown in FIG. 3, but they preferably consist of two springs as shown in FIG. 4, one 53a coupled to the jaw 27 and to the plate 25 and weaker than the other, 53b which is coupled to the jaw 28 and to the plate 25.

In the position of rest, the device occupies the position shown in FIG. 4, in which the piston 31 is in abutment by its collar 37 against the shoulder 39, while the piston 41 is in abutment against the piston 31 and receives in abutment the nut 47 of the tail 46 of the part 32, the ring 48 being in turn abutted at 50 against the nut 47 and having its collar 49 in abutment both against the shoulder 36 and against the extremity 45 of the piston 41.

When the pedal 11 is depressed to apply the brakes, oil is driven from the master-cylinder 10 through the conduits 12, 13 into the cylinders 23 of the front brakes 16 and 17, and through the conduits 14, 15 into the chambers 44 of the rear brakes 16′ and 17′.

The front brakes 16 and 17, of normal construction, act with the jaw 18 compressed and the jaw 19 in tension when the braking is effected during forward running (arrows F), which ensures a suitable degree of self-application.

When the pressure is admitted to the chamber 44 of each rear brake, this pressure tends to move the piston 31 towards the left of FIG. 4, rather than the piston 41 towards the right, since the spring 53a is weaker than the spring 53b.

The movement of the piston 31 towards the left causes first of all the jaws 27 and 28 to be brought into contact with the drum 24, this condition being obtained when the piston 31 is located substantially in the middle of its travel defined by the collar 37 between the abutments 39 and 40.

When the jaws 27 and 28 are in contact with the drum 24 the forces applied to the assembly 41, 46 and 32 are as follows: towards the right-hand side, the pressure developed in the chamber 44 multiplied by the section of the piston 41, plus the pre-stress of the spring 52 and, towards the left-hand side, the force possessed by the extremity of the jaw 28, resulting from the winding effect of the jaws 27 and 28 in contact with the drum, this force being a multiple of the force applied to the piston 31 by the pressure in the chamber 44.

As long as the force towards the right-hand side is not exceeded by the force towards the left, the elements 41, 46, 32, 48, 52 continue to occupy the position of rest shown in FIG. 4, while the piston 31 continues to occupy its position in which the collar 37 is substantially at half its travel between the abutments 39 and 40.

In this first phase, the braking is very effective, with a high degree of self-application, higher than that obtained on the front brakes 16, 17, since in this case the two jaws 27, 28 act in compression, while in the front brakes only one of the two jaws, namely the jaw 18, acts in compression. The braking in this first phase is in any case limited to the calibration of the spring 52.

As and when the control pressure increases in the chamber 44, the force towards the left-hand side increases faster than does the force towards the right, and a moment arrives when the two forces become equal and then the force towards the left exceeds the force towards the right.

From that moment, the part 32 is pushed towards the left and moves the piston 41 by the tail 46 and the nut 47, while, by reason of the corresponding circular movement of the jaws 27 and 28, the piston 31 is permitted to move towards the left.

It will be observed that during these movements, the ring 48 remains in abutment by its collar 49 against the shoulder 36, and the spring 52 is compressed beyond its pre-stressing load.

When the collar 37 of the piston 31 comes into abutment against the ring 40, the piston 31 is prevented from moving further towards the left of FIG. 4, and the increase of pressure at 44 has therefore the effect of pushing back the assembly 41, 46 and 32 towards the right-hand side of FIG. 4.

From this moment, a second phase of the braking appears, in which the rear brakes act with a self-releasing action, that is to say with a very good balancing.

In other words, by virtue of the invention, the rear brakes are very effective for easy braking or at the beginning of hard braking, and act more moderately, that is to say without risk of locking, when the braking action is strongly increased.

In the case of FIG. 4, the pistons 31 and 41 have the same diameter and are engaged in the same bore 33, but they may also have different dimensions. For example, in FIG. 5, the piston 31 has a smaller diameter than the piston 41, and the bore 33 comprises two portions 33a and 33b intended to receive the pistons 31 and 41 respectively. This is also true to FIG. 6, but in this case the piston 31 has a larger diameter than the piston 41.

Figure 5:
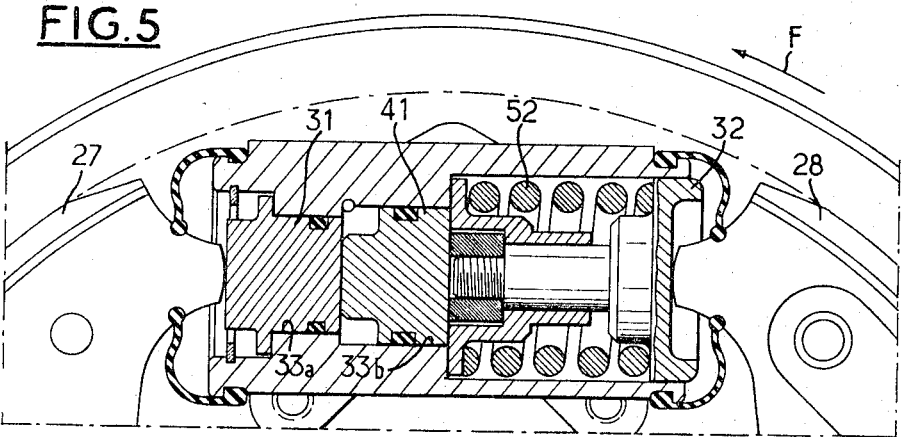
FIGS. 5 and 6 are views similar to FIG. 4, but relating respectively to two alternative forms of cylinder.
Figure 6:
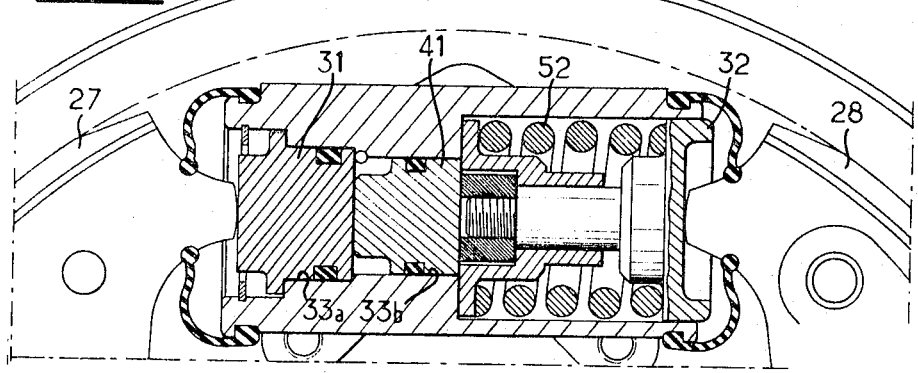

The operation of the devices shown in FIG. 5 and in FIG. 6 are similar to that which has been described with reference to FIG. 4. The choice of the diameters is made as a function of the desired effectiveness in each of the first and second phases of braking. The effectiveness of the first phase becomes greater as the diameter of the piston 31 increases and the second phase becomes more effective as the diameter of the piston 41 increases.

Figure 7:
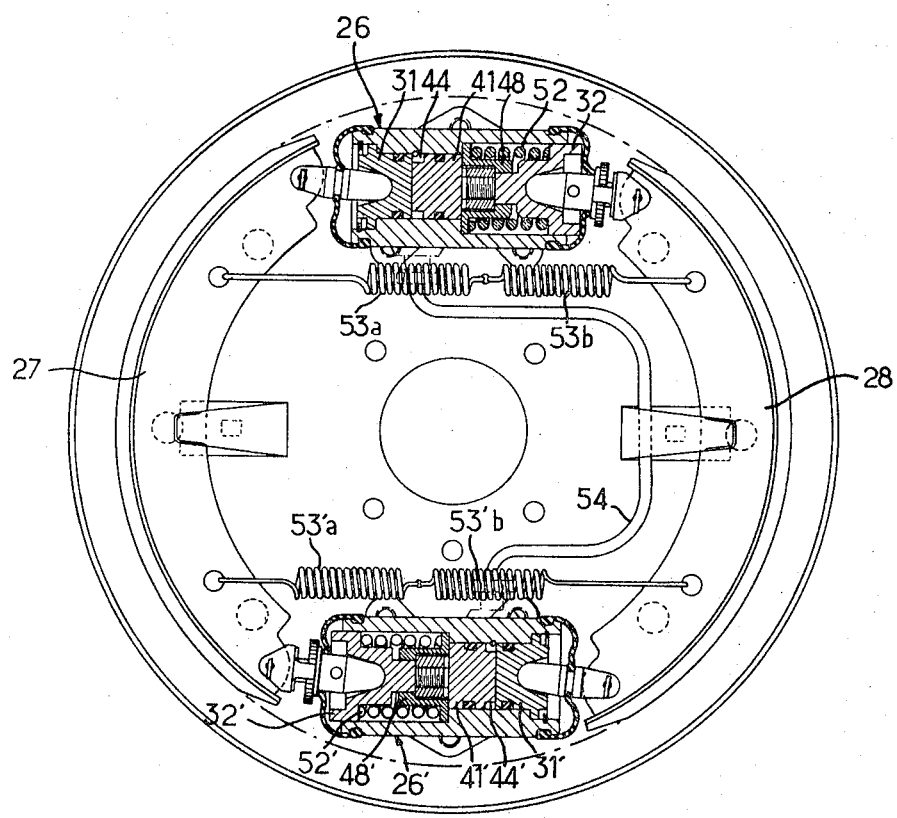
FIG. 7 is a view similar to FIG. 3, but concerning a further alternative construction of the brake.

Reference will now be made to FIG. 7, in which the arrangement is similar to that which is shown in FIGS. 3 and 4, but in this case the coupling strap 29 is eliminated and is replaced by a cylinder 26', identical with the cylinder 26, the various parts of which are the same as those of the cylinder 26 and are indicated by the same reference figures with an apostrophe.

The jaw 27 extends between the piston 31 of the cylinder 26 and the part 32' of the cylinder 26', while the jaw 28 extends between the piston 31' of the cylinder 26' and the part 32 of the cylinder 26. The chambers 44 and 44' are interconnected by a conduit 54, and are coupled to the conduit 14 or 15. Springs 53a' and 53b' return the jaws 27 and 28 to the vicinity of the cylinder 26', in the same manner as the springs 53a and 53b restore the said jaws to the vicinity of the cylinder 26.

The operation of the device shown in FIG. 7 is similar to that which has been described previously. It will be noted that the springs 52 and 52' may have the same pre-stress and the same stress, but could also have characteristics completely or partly different. In the case of different pre-stresses, the brake has the following three phases of operation: the first, before the lower pre-stress has been reached, in which the two jaws act in compression; the second, located between the two pre-stress values, in which one of the jaws acts in compression and the other in tension; and the third, after the highest pre-stress has been reached, in which both jaws act in tension.

It will of course be understood that the front wheel brakes can have various forms, and may for example be disc brakes (not shown) or double-actuated brakes (not shown).

A further application of the invention may be provided for braking installations of the type described in the Certificate of Addition No. 71,181 filed on April 11, 1957 and attached to French Patent No. 1,146,888 filed on Mar. 8, 1956, for "Improvements in brakes, especially for automobile vehicles" in the name of the Société Anonyme Française du Ferodo. In a braking installation of this kind (see FIG. 8), the rear brakes 16' and 17' are supplied by conduits 63, 64, 65 with a pressure which is developed by the reaction of the front brakes 15, 17. The rear brakes 16', 17' are therefore actuated with a delay with respect to the front brakes 16, 17. In this case also, the arrangement according to the invention has the additional advantage of taking-up this delay very rapidly, thus enabling advantage to be taken of the full effectiveness of the rear brakes from the start of the braking operation.

It will of course be understood that the invention is not limited to the forms of construction described and shown, but includes all alternative forms.

What I claim is:

An automotive vehicle brake system, comprising two front brakes and two rear brakes, means for supplying fluid under pressure to all said brakes, each of said rear brakes comprising a rotatable drum rigid in rotation with a vehicle wheel, interconnected first and second brake shoes floatingly disposed within said drum and adapted to be frictionally applied thereto, elastic restoring means for disengaging the shoes from the drum, a stationary hydraulic cylinder, a first piston and a second piston slidably disposed in the cylinder, said first piston bearing against the first shoe, a distance piece between said second piston and the second shoe, said distance piece having rod portion and a collar portion, a ring slidably disposed on said rod portion and adapted to abut against said cylinder and against said second piston, and prestressed compression spring means extending between said collar portion and said ring, abutment means on the cylinder for limiting the travel of said first piston, said supply means including means for applying between the two pistons increasing pressures varying successively through a range of low pressures, a value of transition, and a range of high pressures, said pistons and shoes being movable relative to said drum under the range of low pressures in a direction such that the head portion of each shoe is more firmly engaged with the drum than is the tail portion of each shoe with respect to the direction of rotation of the drum, said shoes, pistons and distance piece being movable when said increasing pressure reaches said value of transition, in the direction of rotation of the drum until said first piston reaches said abutment means, said second piston being movable during the range of high pressures so that the tail portion of each shoe becomes more firmly engaged with the drum than is the head portion of each shoe with respect to the direction of rotation of the drum, said first and second pistons having substantially equal cross-sectional areas so that no substantial decrease in the volume between the pistons occurs during brake application thus avoiding noise and shocks.

References Cited
UNITED STATES PATENTS

| | | | |
|---|---|---|---|
| 1,460,164 | 6/1923 | Laughead. | |
| 2,003,972 | 6/1935 | Oliver | 188—152 X |
| 2,135,003 | 11/1938 | Harrison | 188—152 |
| 3,044,581 | 7/1962 | Lepelletier | 188—152 |
| 3,137,370 | 6/1964 | Lepelletier | 188—152 |

MILTON BUCHLER, *Primary Examiner.*

G. E. HALVOSA, *Assistant Examiner.*